United States Patent
Balakrishnan et al.

(10) Patent No.: US 9,014,121 B2
(45) Date of Patent: Apr. 21, 2015

(54) APPARATUS AND METHOD FOR ACQUISITION OF A COMMON ENHANCED DEDICATED CHANNEL RESOURCE

(75) Inventors: Anoopkumar Balakrishnan, Birmingham (GB); Keiichi Kubota, Weybridge (GB)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 13/810,690

(22) PCT Filed: Jul. 21, 2011

(86) PCT No.: PCT/IB2011/053267
§ 371 (c)(1),
(2), (4) Date: Mar. 14, 2013

(87) PCT Pub. No.: WO2012/011077
PCT Pub. Date: Jan. 26, 2012

(65) Prior Publication Data
US 2013/0176976 A1    Jul. 11, 2013

Related U.S. Application Data

(60) Provisional application No. 61/366,397, filed on Jul. 21, 2010.

(51) Int. Cl.
*H04W 4/00* (2009.01)
*H04W 72/04* (2009.01)
*H04W 74/08* (2009.01)
*H04L 29/08* (2006.01)
*H04W 28/04* (2009.01)

(52) U.S. Cl.
CPC .......... *H04W 72/0413* (2013.01); *H04W 72/04* (2013.01); *H04W 28/04* (2013.01); *H04W 74/08* (2013.01); *H04L 69/32* (2013.01)

(58) Field of Classification Search
CPC ..... H04W 84/18; H04W 84/12; H04W 88/08; H04W 76/00; H04W 72/04; H04W 72/0446; H01L 1/0001
USPC ......... 370/328, 329, 330, 331, 338, 341, 310, 370/431, 389, 436, 465
See application file for complete search history.

(56) References Cited

U.S. PATENT DOCUMENTS

| | | | |
|---|---|---|---|
| 8,411,652 B2 * | 4/2013 | Hans et al. | 370/338 |
| 2005/0117519 A1 * | 6/2005 | Kwak et al. | 370/236 |

(Continued)

FOREIGN PATENT DOCUMENTS

| | | |
|---|---|---|
| EP | 1 689 130 A1 | 8/2006 |
| EP | 2 136 592 A1 | 12/2009 |
| WO | WO 2009/038300 A1 | 3/2009 |

OTHER PUBLICATIONS

3GPP TS 25.301 V8.7.0 (Jun. 2010), "3rd Generation Partnership Project; Technical Specification Group Radio Access Network; Radio Interface Protocol Architecture (Release 8)", 53 pgs.

(Continued)

*Primary Examiner* — Anh Ngoc Nguyen
(74) *Attorney, Agent, or Firm* — Harrington & Smith

(57) ABSTRACT

An apparatus, method and system for acquisition of an uplink communication resource in a communication system. In one embodiment, the apparatus includes a processor, and memory including computer program code configured to, with the processor, cause the apparatus to generate a first message indicating that data is ready for transmission on an uplink, initiate a procedure in a Layer 1 (L1) subsystem to acquire an uplink communication resource in response to the first message, receive a second message from the L1 subsystem indicating failure to acquire the uplink communication resource, and generate a third message for a radio link control (RLC) subsystem to proceed as if the RLC subsystem transmits an uplink RLC protocol data unit in response to the second message.

20 Claims, 9 Drawing Sheets

(56) References Cited

U.S. PATENT DOCUMENTS

| 2007/0047486 | A1 | 3/2007 | Lee et al. | 370/329 |
| 2010/0074203 | A1* | 3/2010 | Pani et al. | 370/329 |
| 2010/0118857 | A1 | 5/2010 | Chun et al. | 370/346 |

OTHER PUBLICATIONS

3GPP TS 25.319 V8.10.0 (Jun. 2010), "3$^{rd}$ Generation Partnership Project; Technical Specification Group Radio Access Network; Enhanced uplink; overall description; Stage 2 (Release 8)", 66 pgs.

3GPP TS 25.321 V8.10.0 (Jun. 2010), "3$^{rd}$ Generation Partnership Project; Technical Specification Group Radio Access Network; Medium Access Control (MAC) protocol specification (Release 8)", 189 pgs.

3GPP TS 25.322 V 8.9.0 (Jun. 2010), "3$^{rd}$ Generation Partnership Project; Technical Specification Group Radio Access Network; Radio Link Control (RLC) protocol specification (Release 8)", 88 pgs.

3GPP TS 25.331 V8.11.0 (Jun. 2010), "3$^{rd}$ Generation partnership Project; Technical Specification Group Radio access Network; Radio Resource Control (RRC); Protocol specification (Release 8)", relevant sections 7, 8.5.4A, 8.5.45, 8.5.45a, 9 pgs.

* cited by examiner

APPARATUS AND METHOD FOR ACQUISITION OF A COMMON ENHANCED DEDICATED CHANNEL RESOURCE

TECHNICAL FIELD

The present invention is directed, in general, to communication systems and, in particular, to an apparatus, method and system for acquisition of an uplink communication resource in a communication system.

BACKGROUND

The Third Generation Partnership Project ("3GPP") is an international association of telecommunications network operators and manufacturers hosted by the International Telecommunications Union ("ITU") to develop and evolve standards for mobile communications systems. As wireless communication systems such as cellular telephone, satellite, and microwave communication systems become widely deployed and continue to attract a growing number of users, there is a pressing need to accommodate a large and variable number of communication devices that transmit an increasing quantity of data within a fixed spectral allocation and limited transmit power. The increased quantity of data is a consequence of wireless communication devices transmitting video information and surfing the Internet, as well as performing ordinary voice communication. The aforementioned services are provided while accommodating substantially simultaneous operation of a large number of wireless communication devices.

To address these ongoing needs, a current topic of general interest in 3GPP is the use of an enhanced dedicated channel ("E-DCH") in a universal mobile telecommunication system ("UMTS"). The enhanced dedicated channel is a third generation ("3G") transport uplink channel used in high-speed uplink packet access ("HSUPA") to improve capacity and data throughput and to reduce delays in dedicated uplink channels. The specifications for high-speed uplink packet access are included in 3GPP Technical Specification ("TS") 25.319 V8.10.0, entitled "Technical Specification Group Radio Access Network; Enhanced Uplink; Overall Description; Stage 2," dated June 2010 and 3GPP TS 25.321 V8.10.0, entitled "Technical Specification Group Radio Access Network; Medium Access Control (MAC) protocol specification," dated June 2010, which are incorporated herein by reference.

The high-speed uplink packet access uses an uplink E-DCH that employs a shorter transmission time interval ("TTI") that enables faster link adaptation and hybrid automatic repeat requests ("HARQs") with incremental redundancy, which makes retransmissions more effective. The high-speed uplink packet access uses a packet scheduler, but it operates on a request-grant principle whereby wireless communication devices such as user equipment request permission to send data, and the packet scheduler decides when and how many user equipment will be allowed to send the data. A request for transmission can contain information about the state of a transmission buffer and a queue at the user equipment and its available power margin.

During re-acquisition of a common E-DCH resource (e.g., as defined in 3GPP TS 25.321, V8.10.0) from the communication system or network, the initial attempt by the user equipment to acquire the common E-DCH resource may fail. Present 3GPP technical specifications do not describe a subsequent action after a failure to acquire a common E-DCH resource. Such failure could lead to a deadlock situation within the user equipment until an initiation of another common E-DCH resource associated with the transmission of new data.

One of the more problematic issues is how to enable user equipment to make another attempt to acquire a common E-DCH resource, especially when a first attempt to acquire the common E-DCH resource fails. In view of the growing deployment of communication systems such as cellular communication systems and this unresolved issue, it would be beneficial to employ an apparatus, method and system that enable the user equipment to make another attempt to acquire a common E-DCH resource that avoids the deficiencies of current communication systems.

SUMMARY

These and other problems are generally solved or circumvented, and technical advantages are generally achieved, by embodiments of the present invention, which include an apparatus, method and system for acquisition of an uplink communication resource in a communication system. In one embodiment, the apparatus includes a processor, and memory including computer program code configured to, with the processor, cause the apparatus to generate a first message indicating that data is ready for transmission on an uplink, initiate a procedure in a Layer 1 ("L1") subsystem to acquire an uplink communication resource in response to the first message, receive a second message from the L1 subsystem indicating failure to acquire the uplink communication resource, and generate a third message for a radio link control ("RLC") subsystem to proceed as if the RLC subsystem transmits an uplink RLC protocol data unit ("PDU") in response to the second message.

In another embodiment, the apparatus includes a processor, and memory including computer program code configured to, with the processor, cause the apparatus to generate a first message indicating that data is ready for transmission on an uplink, initiate a procedure in a Layer 1 ("L1") subsystem to acquire an uplink communication resource in response to the first message, receive a second message from the L1 subsystem indicating failure to acquire the uplink communication resource, and generate a third message for a radio link control ("RLC") subsystem indicating a successful acquisition of the uplink communication resource.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system to acquire an uplink communication resource (e.g., a common E-DCH resource) in a communication system, especially when a first attempt to acquire the common E-DCH resource fails. The apparatus, method and system are applicable, without limitation, to any communication system including existing and future 3GPP technologies (i.e., UMTS, LTE, and its future variants such as fourth generation ("4G") communication systems).

Figure 1:
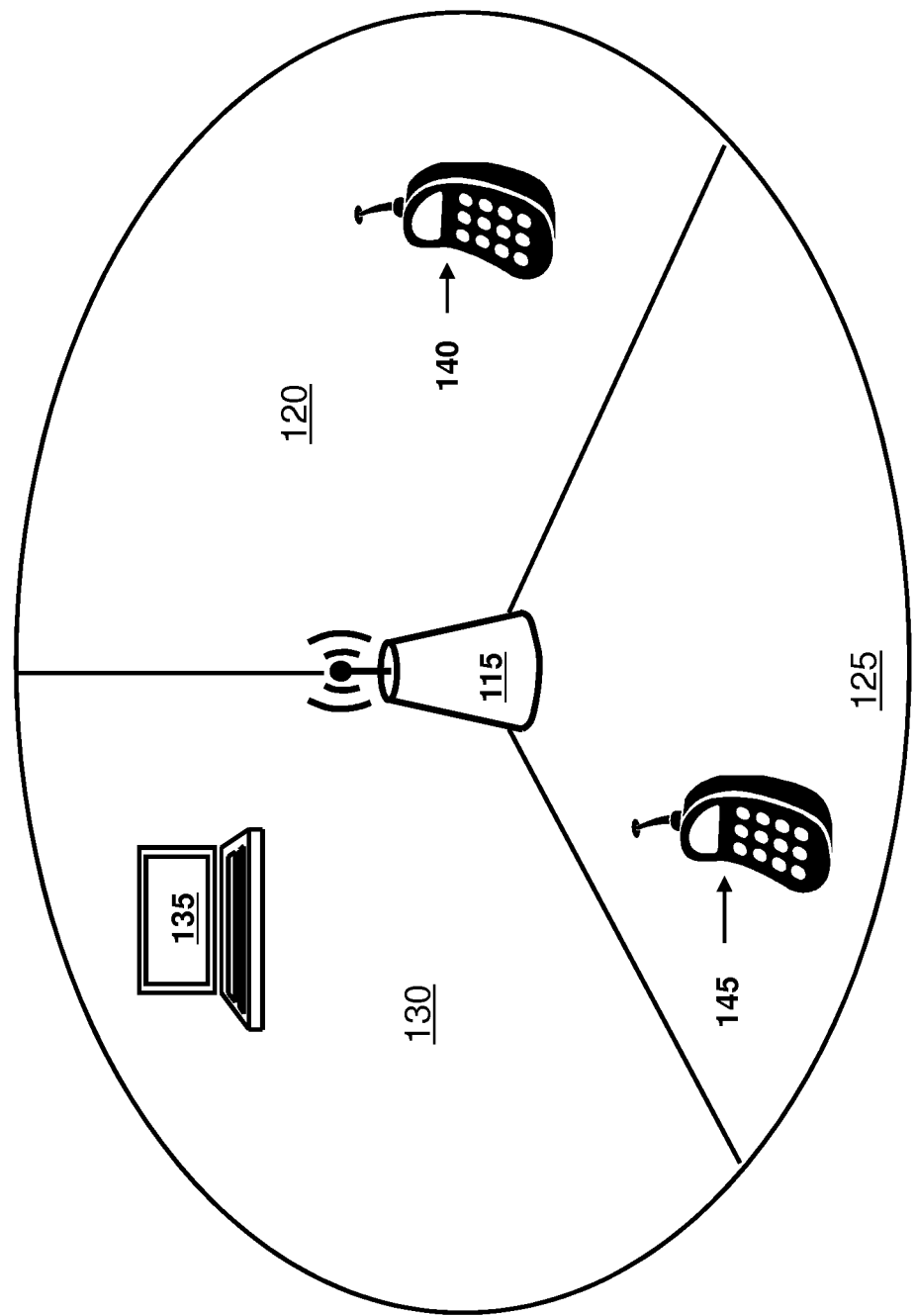
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station (e.g., a Node B) 115 and wireless communication devices (e.g., user equipment) 135, 140, 145 that provides an environment for application of the principles of the present invention. The base station 115 is coupled to a radio network controller. The base station 115 is configured with a plurality of antennas to transmit and receive signals in a plurality of sectors including a first sector 120, a second sector 125, and a third sector 130, each of which typically spans 120 degrees. Although FIG. 1 illustrates one wireless communication device (e.g., wireless communication device 140) in each sector (e.g. the first sector 120), a sector (e.g. the first sector 120) may generally contain a plurality of wireless communication devices. The three sectors or more than three sectors are configured per frequency, and one base station 115 can support more than one frequency. In an alternative embodiment, a base station 115 may be formed with only one sector (e.g. the first sector 120), and multiple base stations may be constructed to transmit according to multi-input/multi-output ("MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, device-to-device and machine-to-machine communications or other communications.

Figure 2:
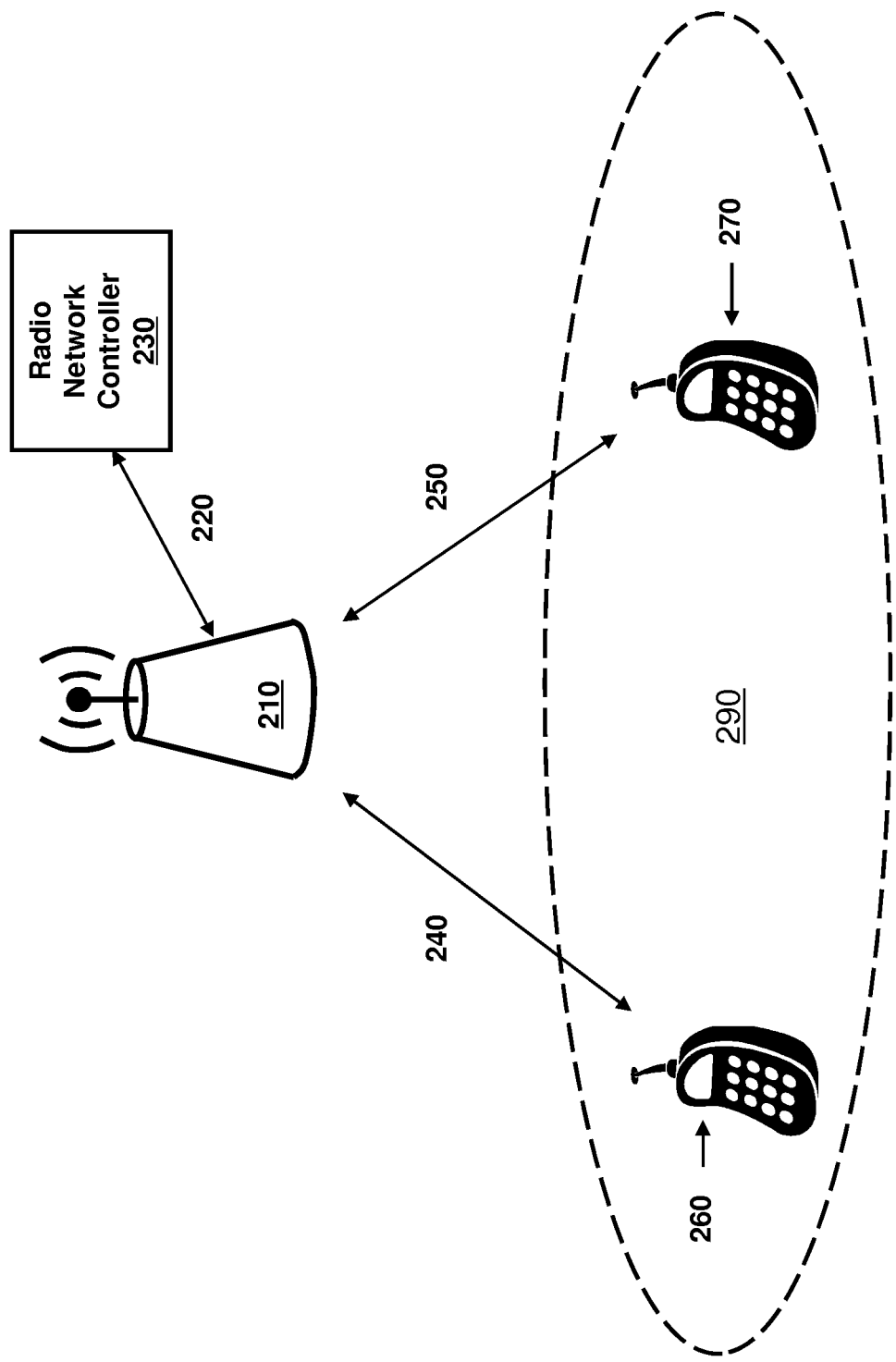

Turning now to FIG. 2, illustrated is a system level diagram of an embodiment of a communication system including a base station (e.g., a Node B) 210 and wireless communication devices (e.g., user equipment) 260, 270 that provides an environment for application of the principles of the present invention. The communication system includes the base station 210 coupled by communication path or link 220 (e.g., by a fiber-optic communication path) to a radio network controller 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications.

Figure 3:
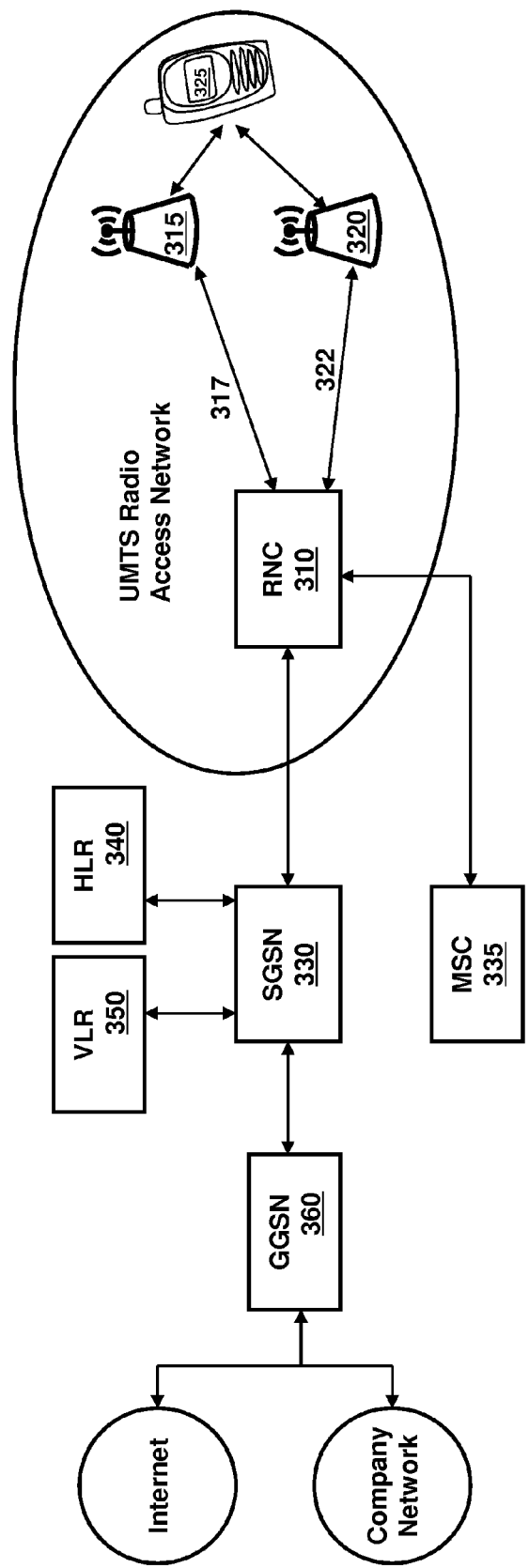
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including wireless communication systems that provides an environment for application of the principles of the present invention. The communication system includes a UMTS radio access network ("UTRAN") including a radio network controller ("RNC") 310 coupled to Node Bs 315, 320 by communication paths or links (e.g., by fiber-optic communication paths) 317, 322, respectively. The Node Bs 315, 320 may be coupled over wireless communication paths to a plurality of user equipment (one of which is designated 325 and also referred to as a subscriber station). A general description of the UMTS architecture and protocol structure overview can be found in 3GPP TS 25.301 V8.7.0, entitled "Technical Specification Group Radio Access Network; Radio Interface Protocol Architecture," dated June 2010, which is incorporated herein by reference.

The radio network controller 310 is a control element in the UTRAN and is responsible for controlling the Node Bs 315, 320. The radio network controller 310 performs radio resource management, selected mobility management functions, and performs encryption before data is sent to and from the user equipment 325. The radio network controller 310 connects to a serving general packet radio service ("GPRS") support node ("SGSN") 330 for packet switched domain service and connects to a mobile switching center ("MSC") 335 for circuit switched domain service, which delivers data packets to and from user equipment within its served area. The GPRS communication system is used by global system for mobile communications ("GSM") user equipment for transmitting Internet protocol ("IP") packets. The GPRS core network is the centralized part of the GPRS communication system, and provides support for wideband code division multiple access ("WCDMA")-based networks. The associated tasks include packet routing and transfer, mobility management (attach/detach and location management), logical link management, and authentication and charging functions.

A plurality of location registers (e.g., home location register ("HLR") 340 and visitor location register ("VLR") 350) coupled to the SGSN 330 stores location information and provides profiles (e.g., international mobile subscriber identity ("IMSI") address(es) used in the packet data network) of GPRS subscriber stations registered with the SGSN 330. The VLR 350 provides a listing of current subscriber stations that have roamed into a particular served area. The HLR 340 is a database that contains details of each subscriber station that is authorized to use the communication system. A subscriber identity module ("SIM") (e.g., a removable card in the subscriber station) stores a subscriber's key that identifies the subscriber, phone number, network authorization data, personal security keys, contact lists, and stored text messages on the subscriber station including a mobile telephony device such as a laptop computer to the HLR 340. Security features for the subscriber identity module include authentication and encryption measures to protect data therein and to prevent eavesdropping. The subscriber identity module allows a user to change subscriber stations by simply removing the card from one subscriber station and inserting it into another. The HLR 340 store details of every subscriber identity module issued by the telephony operator. Each subscriber identity module has a unique identifier (e.g., the IMSI) that is the primary key to each record in the HLR 340.

There can be several logical and physical HLRs per public land mobile network ("PLMN"), though one IMSI/mobile subscriber integrated services digital network number ("MSISDN") pair can be associated with only one logical HLR, which can span several physical nodes at a time. The MSISDN is a number uniquely identifying a subscription in a GSM or a UMTS communication system or network. The MSISDN is the telephone number of the subscriber identity module in a subscriber station.

The MSISDN and the IMSI thus identify a subscriber station. The latter identifies the subscriber identity module, while the former is used for routing communications such as calls to the subscriber station. The IMSI is often used as a key in the database of the HLR 340, and MSISDN is the number normally employed to connect a call to a subscriber station. A subscriber identity module is uniquely associated to an IMSI, while the MSISDN can change in time (e.g., due to number portability). In other words, different MSISDNs can be associated with a particular subscriber identity module.

The MSC 335 is the primary service delivery node for GSM that handles voice calls and short message service ("SMS") as well as other services such as conference calls, facsimile and circuit switched data. The MSC 335 sets up and releases the end-to-end connection, handles mobility and hand-over requirements during the call and takes care of charging and real-time pre-paid account monitoring.

A gateway GPRS support node ("GGSN") 360 is another principal component of the GPRS communication system. The GGSN 360 is responsible for the interworking between the GPRS communication system and external packet switched networks such as the Internet. The GGSN 360 converts the GPRS packets coming from the SGSN 330 into the appropriate packet data protocol ("PDP") format (e.g., Internet protocol ("IP") or X.25 format), and sends the packets out on the corresponding packet data network. X.25 is a standard protocol suite for packet switched wide area network ("WAN") communication. In the other direction, the packet data protocol addresses incoming data packets converted to the GSM address of the destination subscriber station. The GGSN 360 is responsible for IP address assignment and is the default router for the connected subscriber station. THE GGSN 360 performs other functions including subscriber station screening, IP pool management and address mapping, quality of service and PDP context enforcement, and authentication and charging functions.

Figure 4:
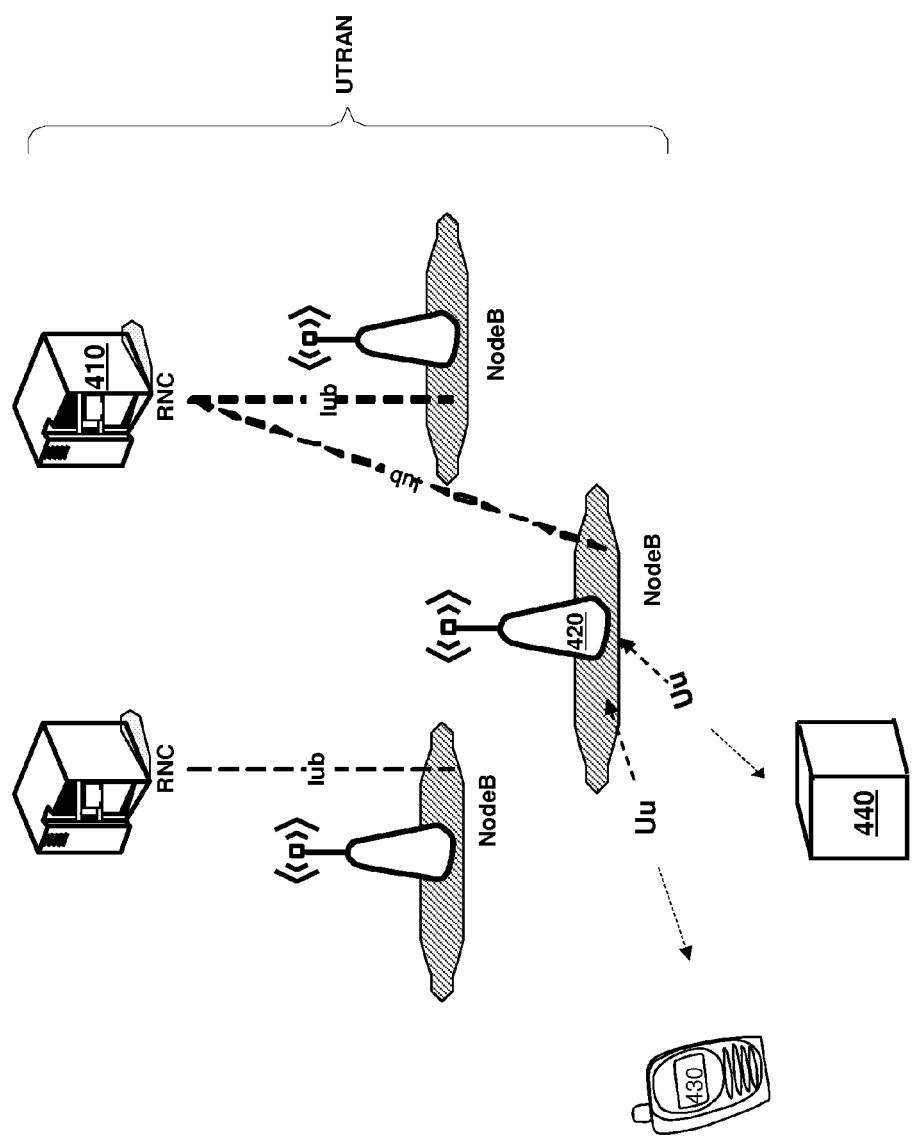

Turning now to FIG. 4, illustrated is a system level diagram of an embodiment of a communication system including wireless communication systems that provides an environment for application of the principles of the present invention. The communication system includes a UMTS radio access network ("UTRAN") including a radio network controller ("RNC") (one of which is designated 410) coupled to Node B (one of which is designated 420) by Iub communication paths or links (e.g., by fiber-optic communication paths). The Node Bs 420 may be coupled over Uu wireless communication paths to a plurality of user equipment 430, 440, which may also be referred to as subscriber stations. The user equipment 440 represents an end device such as a meter reader or an alarm system that may transmit machine-to-machine data. The RNCs 430 are coupled through further communication system elements in the core network such as the Internet or to a private company network.

Figure 5:
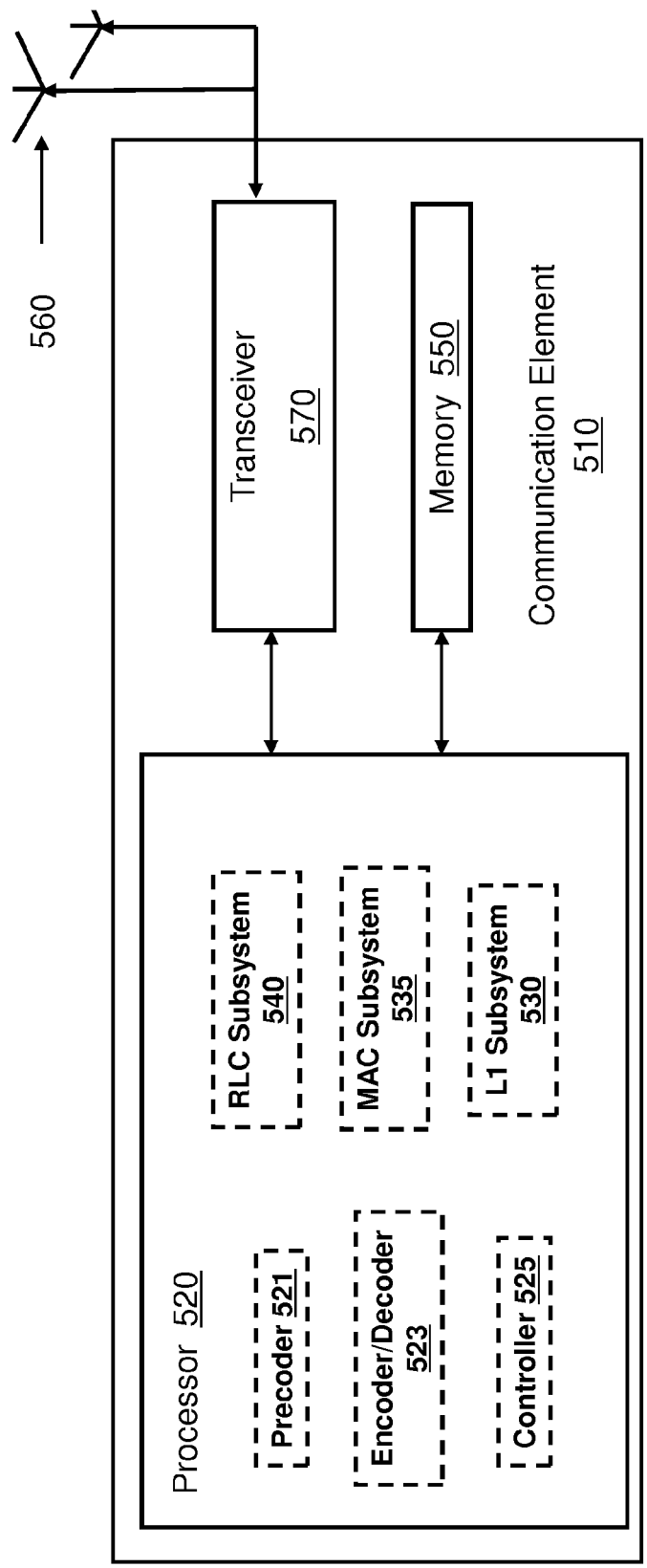
FIG. 5 illustrates a block diagram of an embodiment of a communication element of a communication system for application of the principles of the present invention.

Turning now to FIG. 5, illustrated is a block diagram of an embodiment of a communication element 510 of a communication system for application of the principles of the present invention. The communication element or apparatus or device 510 represents, without limitation, a wireless communication device (e.g., a subscriber station, terminal, mobile station, user equipment, machine, mobile phone, personal digital assistant, USB modem), or the like. The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communication. The communication element 510 can be constructed with more than one antenna, thereby providing a multiple-input multiple-output ("MIMO") capable device. The communication element 510 may provide point-to-point communication services. A communication element 510 formed as a wireless communication device may be a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element, including processes related to management of communication resources. Exemplary functions related to management of communication resources include, without limitation, hardware installation, performance data analysis, and the like.

For instance, in accordance with the memory 550, the processor 520 is configured to employ communication resources (e.g., time, code and frequency communication resources) for transmission of voice, video and data (generally referred to a data) communications to/from the communication element 510 and to format messages including the communication resources therefor in a communication system. In accordance therewith and as further described below in an exemplary embodiment, an apparatus (e.g., the processor 520 of a user equipment) includes a radio link control ("RLC") subsystem 540 configured to generate a first message indicating that data is ready for transmission on an uplink. The apparatus also includes a media access control ("MAC") subsystem 535 configured to initiate a procedure in a Layer 1 ("L1") subsystem 530 to acquire an uplink communication resource (e.g., a common E-DCH resource) in response to the first message, receive a second message from the L1 subsystem 530 indicating failure to acquire the common E-DCH resource, and generate a third message (e.g., a new or existing message type) for the RLC subsystem 540 to proceed as if the RLC subsystem 540 transmits (or has transmitted) an uplink RLC protocol data unit ("PDU") in response to the second message. The third message may also inform the RLC subsystem 540 of a failure to acquire the common E-DCH resource. The RLC subsystem 540 is also configured to manipulate protocol variables and timers as if the RLC subsystem 540 had sent the uplink RLC PDU in response to the second message. The RLC subsystem 540 is still further configured to start a timer and generate another message indicating that data is ready for transmission on the uplink when the timer runs out.

In another embodiment, an apparatus (e.g., the processor 520 of the user equipment) includes the RLC subsystem 540 configured to generate a first message indicating that data is ready for transmission on the uplink. The apparatus also includes the MAC subsystem 535 configured to initiate a procedure in the L1 subsystem 530 to acquire an uplink communication resource (e.g., a common E-DCH resource) in response to the first message, receive a second message from the L1 subsystem 530 indicating failure to acquire the common E-DCH resource, and generate a third message (e.g., a new or existing message type) for the RLC subsystem 540 indicating a successful acquisition of the common E-DCH resource. The RLC subsystem 540 is also configured to generate a data request message including an uplink RLC PDU and manipulate protocol variables and timers. The RLC subsystem 540 is also configured to start a timer and generate another message indicating that data is ready for transmission on the uplink when the timer runs out.

The execution of all or portions of particular functions or processes related to management of common E-DCH resources may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna(s) 560 to another communication element. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or non-volatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein.

Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

An enhanced uplink in CELL_FACH state or idle mode (e.g., as described in 3GPP TS 25.331 V8.11.0, entitled "Technical Specification Group Radio Access Network; Radio Resource Control (RRC) Protocol Specification," dated June 2010, which is incorporated herein by reference, introduced in 3GPP Release-8 allows user equipment in common states, such as the CELL-FACH state or the idle mode, to use high-speed uplink packet access in an E-DCH for uplink transmissions. When a user equipment configured to employ an E-DCH is in a common state and wishes to make an uplink transmission, it requests a common E-DCH resource from the communication system or network. Once the common E-DCH resource has been granted, the user equipment is free to transmit uplink data using assigned common E-DCH resource as long as the common E-DCH resource remains active. The common E-DCH resource can be released either through explicit signalling by the communication system or network or when there is no data in the user equipment for uplink transmission.

An attempt by a user equipment to acquire the common E-DCH resource from a communication system or network may not always be successful. The present structure of 3GPP technical specifications may lead to the deadlock situation in the user equipment wherein the user equipment just waits for allocation of the requested common E-DCH resource. Accordingly, a new process would be preferable to enable the user equipment to initiate an acquisition of a common E-DCH resource from the communication system or network when the requested common E-DCH resource allocation is not received.

In 3GPP Release-99 operating under a normal RACH process wherein a user equipment makes a request to a base station to acquire an uplink communication resource, the MAC layer (or subsystem) in the user equipment would have sent data from an upper layer to the physical layer (e.g., Layer 1 ("L1")), while attempting a Layer 1 physical random access channel ("PRACH") transmission procedure. Layer 1 in the seven-layer open system interconnection model of communication system or network architecture is the physical layer that defines the electrical and physical specifications for devices. For the Release-99 RACH case, the RLC layer (or subsystem) requests an uplink RLC protocol data unit ("PDU") transmission upon initiation of RACH preamble phase and, hence, an RLC timer, which triggers retransmission upon timer expiration is started automatically by the RLC subsystem upon a transmission attempt of the uplink RLC PDU. A RACH transmission failure can be recoverable at the RLC subsystem when the timer times out. Accordingly, the MAC subsystem does not need to send a message to the RLC subsystem to trigger a retransmission. Thus, a L1 failure in the PRACH transmission procedure would have been treated as lost data at the MAC and higher layers (e.g., in RLC layer), which would have enabled the user equipment to make further attempts to transmit the data. Thus, in 3GPP Release-99 operating under a normal RACH process, uplink data in the user equipment is not ordinarily lost.

This is not the case with the common E-DCH resource acquisition process. For the Release-8 Enhanced Uplink in CELL_FACH state and idle mode case, the RLC subsystem does not attempt uplink RLC PDU transmission upon initiation of the RACH preamble phase. No timer in the RLC subsystem is started upon initiation of the RACH preamble phase. Transmission of data starts only after the common E-DCH resource is granted. As a result, the user equipment will not be able to make use of the retransmission mechanism at the RLC layer employing an E-DCH in an attempt to reacquire the common E-DCH resource.

Thus, when the user equipment tries to acquire a common E-DCH resource for the uplink transmission of data, the RLC subsystem informs the MAC subsystem that the uplink data is ready for transmission. After selecting an access service class ("ASC"), the MAC subsystem sends a request (that does not contain any data reported by RLC subsystem) based on a selected persistence value to the L1 to initiate the RACH preamble transmission. The L1 can attempt RACH preamble transmission up to a maximum number of preamble ramping cycles (up to a parameter "Mmax" that is configured by the communication system, e.g. Radio Network Control (RNC)) to acquire the common E-DCH resource. If the communication system does not grant the common E-DCH resource after a certain number of attempts, the MAC subsystem provides an indication of a failure of acquiring the common E-DCH resource to the upper layers (e.g., RLC layer) as per 3GPP TS 25.321 V8.10.0, cited previously hereinabove (see. e.g., subclause 11.2.2A), which is incorporated herein by reference. However, 3GPP technical specifications do not describe a subsequent action by the RLC subsystem after a common E-DCH resource acquisition failure.

As introduced herein, the re-acquisition procedure manipulates RLC protocol variables and protocol timers upon common E-DCH resource acquisition failure. Upon detection at the MAC subsystem of a common E-DCH resource acquisition failure (e.g., by a received common E-DCH resource acquisition failure message), the MAC subsystem in the user equipment requests the RLC subsystem to proceed as if RLC subsystem transmits (or has transmitted) one uplink RLC PDU so that RLC subsystem can start the protocol timers, which will trigger retransmission upon the timer expiration (e.g., poll timer). Transmitting the one uplink RLC PDU ordinarily enables the timer to be started in the RLC subsystem as the part of polling functionality. Failure to enable the timer is an indication to RLC subsystem of failure by the lower layer to acquire the common E-DCH resource. This message from MAC subsystem to the RLC subsystem is a mechanism to inform RLC subsystem of the common E-DCH resource acquisition failure. The message is either a new message or a MAC_STATUS_IND primitive, which is an existing message type enabling communication between the MAC and RLC layers (or subsystems) related to PDU parameters and other status information. In this manner, the MAC subsystem can initiate a common E-DCH resource re-acquisition procedure without additional interaction with other layers or subsystems of the communication system, and user equipment deadlock can be resolved.

In accordance with the foregoing procedure, the user equipment can use the retransmission mechanism of the RLC layer available in Release-99 RACH procedures. The RLC subsystem, therefore, manipulates protocol variables such as send state variable VT(S) (see, e.g., 3GPP TS 25.322 V8.9.0, entitled "Technical Specification Group Radio Access Network; Radio Link Control (RLC) Protocol Specification," dated June 2010, which is incorporated herein by reference, and protocol timers such as timer_poll and/or timer_poll_prohibit upon a communication resource allocation failure, which was done earlier only when RLC subsystem attempted an RLC PDU transmission, rather than just requesting a common E-DCH resource. This way the MAC subsystem can attempt a re-acquisition procedure without any new data generation in the RLC subsystem, and the deadlock situation can be resolved. As introduced herein, the communication resource allocation status (e.g., communication resource allocation failure) is indicated by MAC subsystem to the RLC subsystem, which was not present in a Release-99 RACH procedure.

The implementation employs changes at the user equipment of the communication system. The RLC subsystem informs the MAC subsystem about availability of uplink data that is ready for transmission. The MAC subsystem sends a request to the L1 to initiate the RACH preamble transmission after performing the access service class selection. The L1 sends back a failure notification to the MAC subsystem after attempting a maximum number of RACH preamble ramping cycles. In an embodiment, the L1 examines a response from a base station to determine the status of the common E-DCH resource request. Several non-limiting implementations of the foregoing procedure are introduced herein. All of these processes/methods trigger manipulation of the RLC protocol variables and protocol timers upon a common E-DCH resource acquisition failure.

For a first exemplary method, the MAC subsystem may use a new message to inform the RLC subsystem about a failed acquisition of a communication resource. Upon reception of the message, the RLC subsystem manipulates protocol variables and timers as if the RLC subsystem had sent an uplink RLC PDU. In a second exemplary method, the MAC subsystem uses a new message to inform the RLC subsystem that acquisition of the communication resource has succeeded. The RLC subsystem sends the MAC subsystem a data request message ("MAC_DATA_REQ") containing an uplink RLC PDU from its buffer and manipulates the protocol variables and timers as configured. The MAC subsystem drops the uplink RLC PDU since it knows that acquisition of the communication resource has failed.

In a third exemplary method, the MAC subsystem makes use of an existing message such as a status message ("MAC_STATUS_IND") to inform the RLC subsystem about the failed acquisition of the communication resource. The RLC subsystem manipulates protocol variables and timers as if RLC subsystem had sent an uplink RLC PDU. In a fourth exemplary method, the MAC subsystem makes use of the MAC_STATUS_IND message to inform the RLC subsystem that acquisition of the communication resource was successful. The RLC subsystem sends a MAC_DATA_REQ message to the MAC subsystem containing an uplink RLC PDU from its buffer and manipulates the protocol variables and timers as configured. The MAC subsystem drops the uplink RLC PDU since it knows that acquisition of the communication resource has failed.

Figure 6:
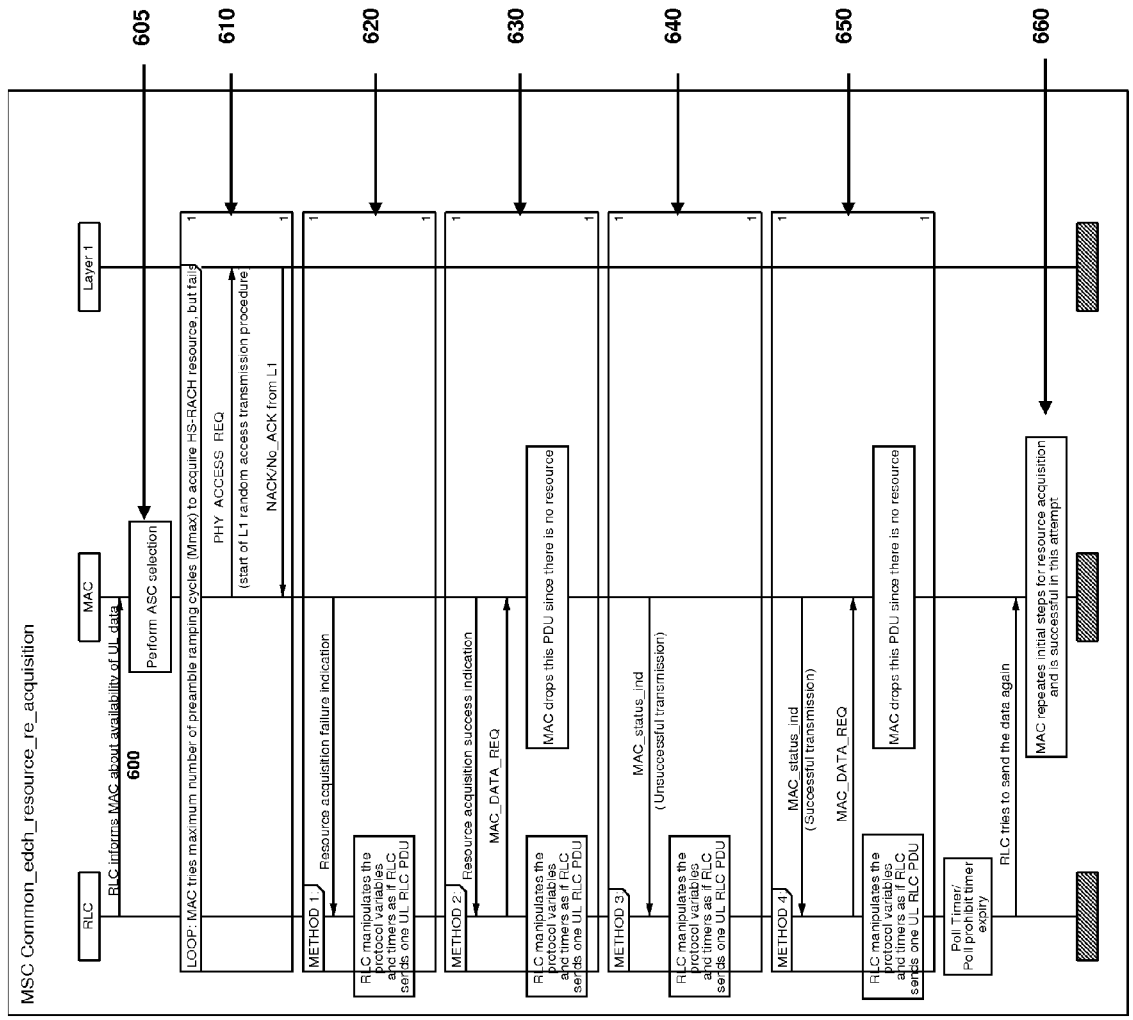
FIGS. 6 to 9 illustrate signalling diagrams demonstrating exemplary embodiments of acquiring a common E-DCH resource according to the principles of the present invention.

Turning now to FIG. 6, illustrated is a signalling diagram demonstrating exemplary embodiments of acquiring a common E-DCH resource according to the principles of the present invention. The signalling diagram illustrates an interaction between a RLC subsystem, MAC subsystem and L1 subsystem of a processor of, for instance, a user equipment. The illustrated embodiment provides the signal flow in accordance with a failed acquisition of a common E-DCH resource for a transmission of data following a maximum number Mmax of preamble ramping cycles attempted by the user equipment. Recall that the L1 in the seven-layer open system interconnection model represents the physical layer (i.e., the lowest layer that defines the electrical and physical specifications for devices).

The RLC subsystem informs the MAC subsystem about a request to transmit uplink data in accordance with a step or module 600. In response to the request, the MAC subsystem performs access service class selection in accordance with a step or module 605. A maximum number Mmax of preamble ramping cycles are executed in accordance with a step or module 610 to acquire a communication resource (a type of common E-DCH resource), which fails. A physical access request message ("PHY_ACCESS_REQ") is made by the MAC subsystem to the L1 subsystem, which starts a L1 random access transmission procedure. The L1 subsystem responds to the MAC subsystem with a negative acknowledgment ("NACK") indicating failure to acquire the common E-DCH resource. Following the step or module 610, one of the following methods may be performed in accordance with the failed acquisition of the common E-DCH resource.

In a first exemplary method (designated as a step or module 620), an indication of communication resource acquisition failure is transferred from the MAC subsystem to the RLC subsystem. In response to the indication, the RLC subsystem manipulates protocol variables and timers as if the RLC subsystem had sent one uplink RLC PDU.

In a second exemplary method (designated as a step or module 630), an indication of communication resource acquisition success is transferred from the MAC subsystem to the RLC subsystem. The RLC subsystem responds with a data request message ("MAC_DATA_REQ"). The MAC subsystem drops the uplink RLC PDU since no common E-DCH resource was allocated. The RLC subsystem manipulates the protocol variables and timers as if RLC subsystem had sent the uplink RLC PDU.

In a third exemplary method (designated as a step or module 640), the RLC subsystem receives a status message ("MAC_STATUS_IND") from the MAC subsystem indicating an unsuccessful transmission of an uplink RLC PDU. In response to this indication, the RLC subsystem manipulates protocol variables and timers as if RLC subsystem had sent the uplink RLC PDU.

In a fourth exemplary method (designated as a step or module 650), the RLC subsystem receives a status message ("MAC_STATUS_IND") from the MAC subsystem indicating a successful transmission of an uplink RLC PDU. In response to this indication, the RLC subsystem manipulates protocol variables and a poll timer and/or a poll prohibit timer as if the RLC subsystem had sent the uplink RLC PDU.

Upon expiration of the poll timer or the poll prohibit timer, the RLC subsystem sends another request to the MAC subsystem (designated as a step or module 660), and MAC subsystem attempts to acquire the common E-DCH resource again by repeating the initial steps for common E-DCH resource acquisition. This way the user equipment can attempt a re-acquisition procedure without any new upper layer data, but by making use of a retransmission mechanism available at the RLC subsystem.

Figure 7:
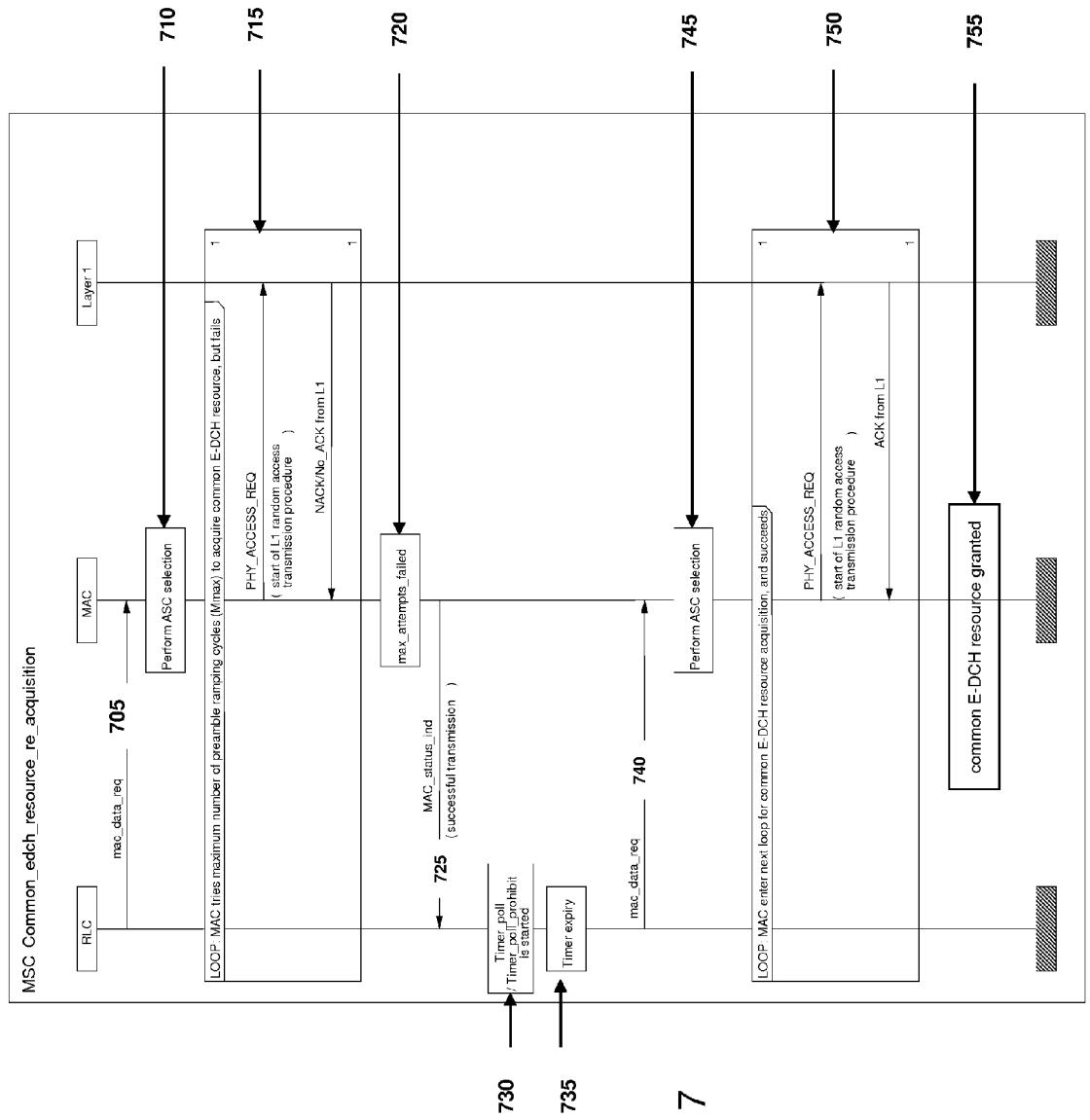

Turning now to FIG. 7, illustrated is a signalling diagram demonstrating an exemplary embodiment of acquiring a common E-DCH resource according to the principles of the present invention. The signalling diagram illustrates an interaction between a RLC subsystem, MAC subsystem and L1 subsystem of a processor of, for instance, a user equipment. The illustrated embodiment provides the signal flow in accordance with an initial failure to acquire a common E-DCH resource after a maximum number Mmax of preamble ramping cycles is attempted by the user equipment for the transmission of data, followed by successful acquisition of the common E-DCH resource for the transmission of the data.

The RLC subsystem informs the MAC subsystem about a request ("mac_data_req") to transmit uplink data in accordance with a step or module 705. In response to the request, the MAC subsystem performs access service class selection in accordance with a step or module 710. A maximum number Mmax of preamble ramping cycles are executed in accordance with a step or module 715 to acquire a communication resource (a type of common E-DCH resource), which fails. A physical access request message ("PHY_ACCESS_REQ") is made by the MAC subsystem to the L1 subsystem, which starts a L1 random access transmission procedure. The L1 subsystem responds to the MAC subsystem with a negative acknowledgment ("NACK") indicating failure to acquire the common E-DCH resource. While the allocation of the common E-DCH resource failed (as indicated by "max_attempts_failed" in accordance with a step or module 720), the MAC subsystem sends a status message ("MAC_STATUS_IND") to the RLC subsystem indicating that the allocation of the common E-DCH resource was successful in accordance with a step or module 725. The RLC subsystem starts a poll timer and/or the poll prohibit timer if the uplink RLC PDU indicates a polling bit in accordance with a step or module 730, and determines after a period of time that the timer has expired in accordance with a step or module 735. The RLC subsystem then transfers a data request message ("mac_data_req") to the MAC subsystem in accordance with a step or module 740, which again responds by performing an access service class selection in accordance with a step or module 745.

The method continues in accordance with a step or module 750 wherein the MAC subsystem transfers a physical access request message ("PHY_ACCESS_REQ") to the L1 subsystem, which attempts to acquire a common E-DCH resource for the user equipment. The acquisition of the common E-DCH resource is successful before a maximum number Mmax of preamble ramping cycles is attempted by the user equipment, which is noted by reception of an acknowledgment message ACK by the MAC subsystem. The MAC subsystem then records that a communication resource (a type of common E-DCH resource) has been granted in accordance with a step or module 755.

Figure 8:
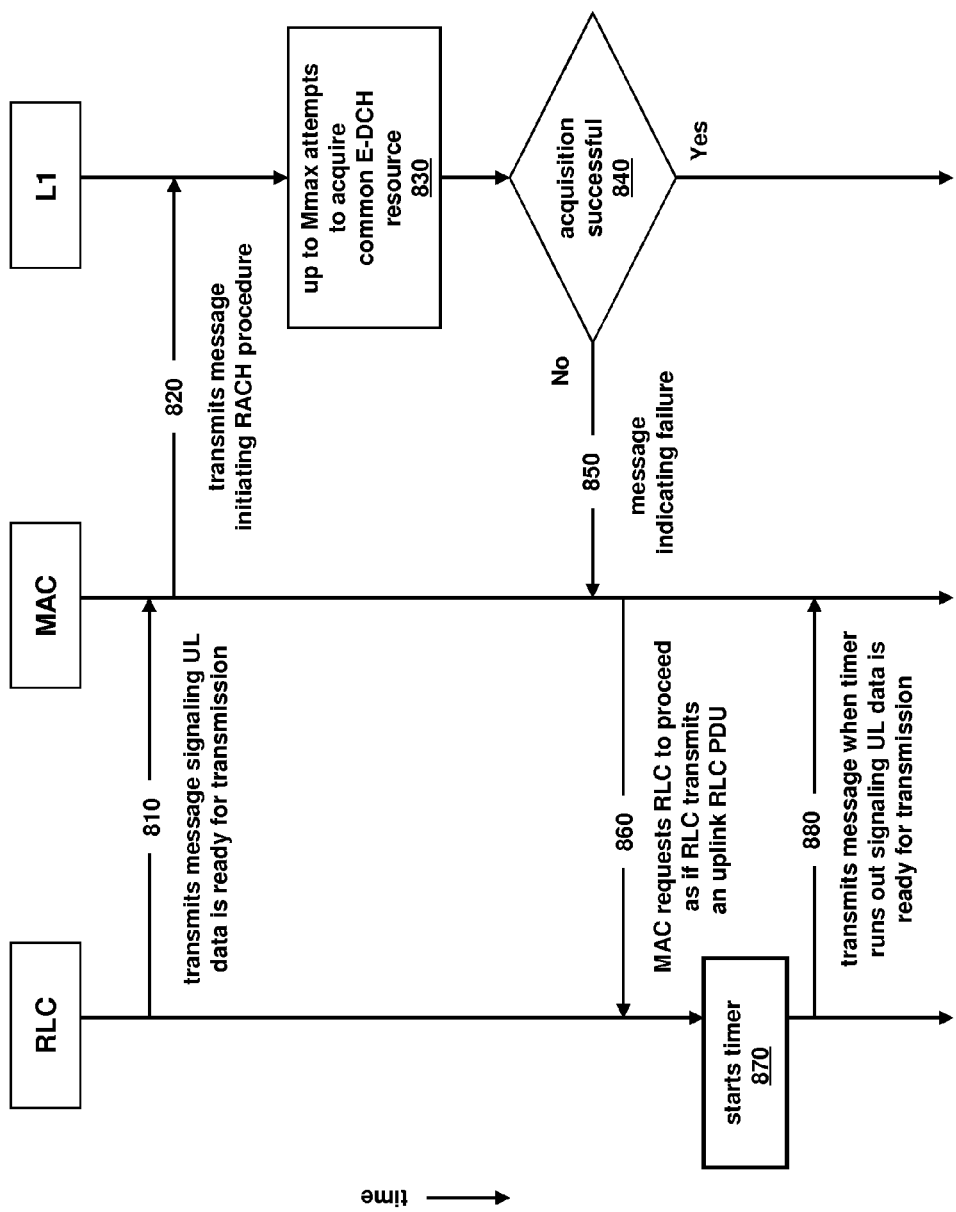

Turning now to FIG. 8, illustrated is a signalling diagram demonstrating an exemplary embodiment of acquiring a common E-DCH resource according to the principles of the present invention. The signalling diagram illustrates an interaction between a RLC subsystem, MAC subsystem and L1 subsystem of a processor of, for instance, a user equipment. The illustrated embodiment provides the signal flow in accordance with a failed acquisition of a common E-DCH resource for the transmission of data following a maximum number Mmax of preamble ramping cycles attempted by the user equipment.

The RLC subsystem informs the MAC subsystem about a request to transmit uplink data in accordance with a step or module 810. In response thereto, the MAC subsystem transfers a message to the L1 subsystem to initiate a RACH preamble transmission to obtain an allocation of a common E-DCH resource in accordance with a step or module 820. In accordance with a step or module 830, the L1 subsystem performs up to a maximum number Mmax of preamble ramping cycles to acquire the common E-DCH resource. In accordance with a step or module 840, the L1 subsystem determines if the acquisition of the common E-DCH resource was successful. If the acquisition was successful, then method continues by transferring the uplink data. If the acquisition was not successful, the L1 subsystem notifies the MAC subsystem in accordance with a step of module 850, and the MAC subsystem responds with a request to the RLC subsystem to proceed as if RLC subsystem transmits (or has transmitted) an uplink RLC PDU in accordance with a step or module 860. The request to the RLC subsystem can be a new message type or an existing message type as described previously. In accordance with a step or module 870, the RLC subsystem starts a poll timer or a poll prohibit timer if the uplink RLC PDU indicates a polling bit. When the timer expires, the RLC subsystem transmits a message to the MAC subsystem indicating that uplink data is ready for transmission in accordance with a step or module 880. Thus, the RLC subsystem is able to make repeated attempts to signal the MAC subsystem that uplink data is ready for transmission.

Figure 9:
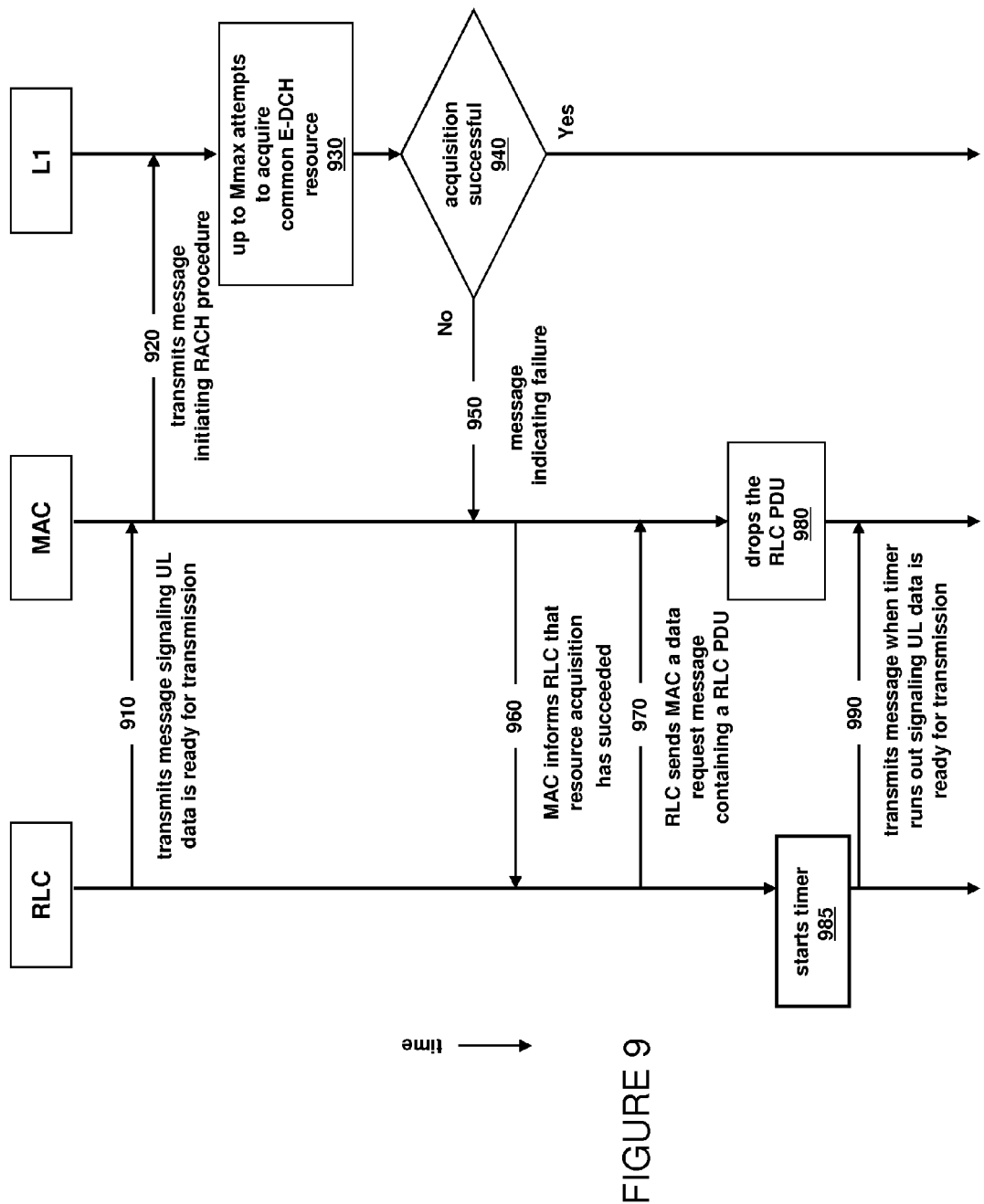

Turning now to FIG. 9, illustrated is a signalling diagram demonstrating an exemplary embodiment of acquiring a common E-DCH resource according to the principles of the present invention. The signalling diagram illustrates an interaction between a RLC subsystem, MAC subsystem and L1 subsystem of a processor of, for instance, a user equipment. The illustrated embodiment provides the signal flow in accordance with a failed acquisition of a common E-DCH resource for the transmission of data following a maximum number Mmax of preamble ramping cycles attempted by the user equipment.

The RLC subsystem informs the MAC subsystem about a request to transmit uplink data in accordance with a step or module 910. In response thereto, the MAC subsystem transfers a message to the L1 subsystem to initiate a RACH preamble transmission to obtain an allocation of a common E-DCH resource in accordance with a step or module 920. In accordance with a step or module 930, the L1 subsystem performs up to a maximum number Mmax of preamble ramping cycles to acquire the common E-DCH resource. In accordance with a step or module 940, the L1 subsystem determines if the acquisition of the common E-DCH resource was successful. If the acquisition was successful, then method continues by transferring the uplink data. If the acquisition was not successful, the L1 subsystem notifies the MAC subsystem in accordance with a step of module 950. However, the MAC subsystem informs the RLC subsystem that the acquisition of the communication resource has succeeded in accordance with a step or module 960. The message to the RLC subsystem can be a new message type or an existing message type as described previously.

The RLC subsystem then transfers to the MAC subsystem a data request message containing a RLC PDU from its buffer and manipulates protocol variables and timers as configured in accordance with a step or module 970. The MAC subsystem, knowing that the communication resource allocation attempt failed, drops the RLC PDU in accordance with a step or module 980. In accordance with a step or module 985, the RLC subsystem starts a poll timer or a poll prohibit timer if the RLC PDU indicates a polling bit. When the timer expires, the RLC subsystem transmits a message to the MAC subsystem indicating that uplink data is ready for transmission in accordance with a step or module 990. Thus, the RLC subsystem is able to make repeated attempts to signal the MAC subsystem that uplink data is ready for transmission. Thus, a deadlock situation in a common E-DCH resource acquisition process is resolved with an implementation employable by the user equipment, thereby mitigating changes to the base station and the like in the communication system.

Thus, an apparatus, method and system are introduced herein for acquisition of a common E-DCH resource in a communication system, especially when an initial attempt has failed. In one embodiment, an apparatus (e.g., embodied in a user equipment) includes a processor and memory including computer program code. The memory and the computer program code are configured to, with the processor, cause the apparatus to generate a first message indicating that data is ready for transmission on an uplink, initiate a procedure in a L1 subsystem to acquire an uplink communication resource (e.g., a common E-DCH resource) in response to the first message, receive a second message from the L1 subsystem indicating failure to acquire the common E-DCH resource; and generate a third message (e.g., a new or existing message type) for a RLC subsystem to proceed as if the RLC subsystem transmits (or has transmitted) an uplink RLC PDU in response to the second message. The third message may inform the RLC subsystem of a failure to acquire the common E-DCH resource. The memory and the computer program code are also configured to, with the processor, cause the apparatus to manipulate protocol variables and timers as if the RLC subsystem had sent the uplink RLC PDU in response to the second message. The memory and the computer program code are also configured to, with the processor, cause the apparatus to start a timer and generate another message indicating that data is ready for transmission on the uplink when the timer runs out.

In another embodiment, an apparatus (e.g., embodied in a user equipment) includes a processor and memory including computer program code. The memory and the computer program code are configured to, with the processor, cause the apparatus to generate a first message indicating that data is ready for transmission on an uplink, initiate a procedure in a L1 subsystem to acquire an uplink communication resource (e.g., a common E-DCH resource) in response to the first message, receive a second message from the L1 subsystem indicating failure to acquire the uplink communication resource, and generate a third message (e.g., a new or existing message type) for a RLC subsystem indicating a successful acquisition of the uplink communication resource. The memory and the computer program code are configured to, with the processor, cause the apparatus to generate a data request message including an uplink RLC PDU and manipulate protocol variables and timers. The memory and the computer program code are configured to, with the processor, cause the apparatus to start a timer and generate another message indicating that data is ready for transmission on the uplink when the timer runs out. Although the apparatus, method and system described herein have been described with respect to cellular-based communication systems, the apparatus and method are equally applicable to other types of communication systems such as a WiMax® communication system.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
   a processor; and
   memory including computer program code,
   said memory and said computer program code configured to, with said processor, cause said apparatus to perform at least the following:
   generate a first message indicating that data is ready for transmission on an uplink;
   initiate a procedure in a layer 1 subsystem to acquire an uplink communication resource in response to said first message;
   receive a second message from said layer 1 subsystem indicating failure to acquire said uplink communication resource; and
   generate a third message for a radio link control subsystem to proceed as if said radio link control subsystem transmits an uplink radio link control protocol data unit in response to said second message.

2. The apparatus as recited in claim 1 wherein said memory and said computer program code are further configured to, with said processor, cause said apparatus to start a timer and generate another message indicating that data is ready for transmission on said uplink when said timer runs out.

3. The apparatus as recited in claim 1 wherein said memory and said computer program code are further configured to, with said processor, cause said apparatus to manipulate protocol variables and timers as if said radio link control subsystem transmits said uplink radio link control protocol data unit in response to said second message.

4. The apparatus as recited in claim 1 wherein said third message informs said radio link control subsystem of a failure to acquire said uplink communication resource.

5. The apparatus as recited in claim 1 wherein said uplink communication resource is a common enhanced dedicated channel communication resource.

6. The apparatus as recited in claim 1 wherein said third message is a new or existing message type.

7. A computer program product including a non-transitory computer-readable medium bearing computer program code embodied therein for use with a computer, comprising:
   code for generating a first message indicating that data is ready for transmission on an uplink;
   code for initiating a procedure in a layer 1 subsystem to acquire an uplink communication resource in response to said first message;
   code for receiving a second message from said layer 1 subsystem indicating failure to acquire said uplink communication resource; and
   code for generating a third message for a radio link control subsystem to proceed as if said radio link control subsystem transmits an uplink radio link control protocol data unit in response to said second message.

8. A method, comprising:
   generating a first message indicating that data is ready for transmission on an uplink; initiating a procedure in a layer 1 subsystem to acquire an uplink communication resource in response to said first message;
   receiving a second message from said layer 1 subsystem indicating failure to acquire said uplink communication resource; and
   generating a third message for a radio link control subsystem to proceed as if said radio link control subsystem transmits an uplink radio link control protocol data unit in response to said second message.

9. The method as recited in claim 8 further comprising starting a timer and generating another message indicating that data is ready for transmission on said uplink when said timer runs out.

10. The method as recited in claim 8 further comprising manipulating protocol variables and timers as if said radio link control subsystem transmits said uplink radio link control protocol data unit in response to said second message.

11. An apparatus, comprising:
    a processor; and
    memory including computer program code,
    said memory and said computer program code configured to, with said processor, cause said apparatus to perform at least the following:
    generate a first message indicating that data is ready for transmission on an uplink;
    initiate a procedure in a layer 1 subsystem to acquire an uplink communication resource in response to said first message;
    receive a second message from said layer 1 subsystem indicating failure to acquire said uplink communication resource; and
    generate a third message for a radio link control subsystem indicating a successful acquisition of said uplink communication resource.

12. The apparatus as recited in claim 11 wherein said memory and said computer program code are further configured to, with said processor, cause said apparatus to start a timer and generate another message indicating that data is ready for transmission on said uplink when said timer runs out.

13. The apparatus as recited in claim 11 wherein said memory and said computer program code are further configured to, with said processor, cause said apparatus to generate a data request message including an uplink radio link control protocol data unit and manipulate protocol variables and timers.

14. The apparatus as recited in claim 11 wherein said uplink communication resource is a common enhanced dedicated channel communication resource.

15. The apparatus as recited in claim 11 wherein said third message is a status message.

16. The apparatus as recited in claim 11 wherein said third message is a new or existing message type.

17. A computer program product including a non-transitory computer-readable medium bearing computer program code embodied therein for use with a computer, comprising:
   code for generating a first message indicating that data is ready for transmission on an uplink;
   code for initiating a procedure in a layer 1 subsystem to acquire an uplink communication resource in response to said first message;
   code for receiving a second message from said layer 1 subsystem indicating failure to acquire said uplink communication resource; and
   code for generating a third message for a radio link control subsystem indicating a successful acquisition of said uplink communication resource.

18. A method, comprising:
   generating a first message indicating that data is ready for transmission on an uplink;
   initiating a procedure in a layer 1 subsystem to acquire an uplink communication resource in response to said first message;
   receiving a second message from said layer 1 subsystem indicating failure to acquire said uplink communication resource; and
   generating a third message for a radio link control subsystem indicating a successful acquisition of said uplink communication resource.

19. The method as recited in claim 18 further comprising starting a timer and generating another message indicating that data is ready for transmission on said uplink when said timer runs out.

20. The method as recited in claim 18 further comprising generating a data request message including an uplink radio link control protocol data unit and manipulating protocol variables and timers.

* * * * *